March 9, 1937. E. G. TEMPLETON 2,073,291
COLLAPSIBLE TIRE BUILDING DRUM
Filed Feb. 11, 1935   14 Sheets-Sheet 1

Inventor
Edwin G. Templeton

By

Attorney

March 9, 1937.  E. G. TEMPLETON  2,073,291
COLLAPSIBLE TIRE BUILDING DRUM
Filed Feb. 11, 1935  14 Sheets-Sheet 2

Inventor
Edwin G. Templeton

By

Attorney

March 9, 1937.   E. G. TEMPLETON   2,073,291
COLLAPSIBLE TIRE BUILDING DRUM
Filed Feb. 11, 1935    14 Sheets-Sheet 3
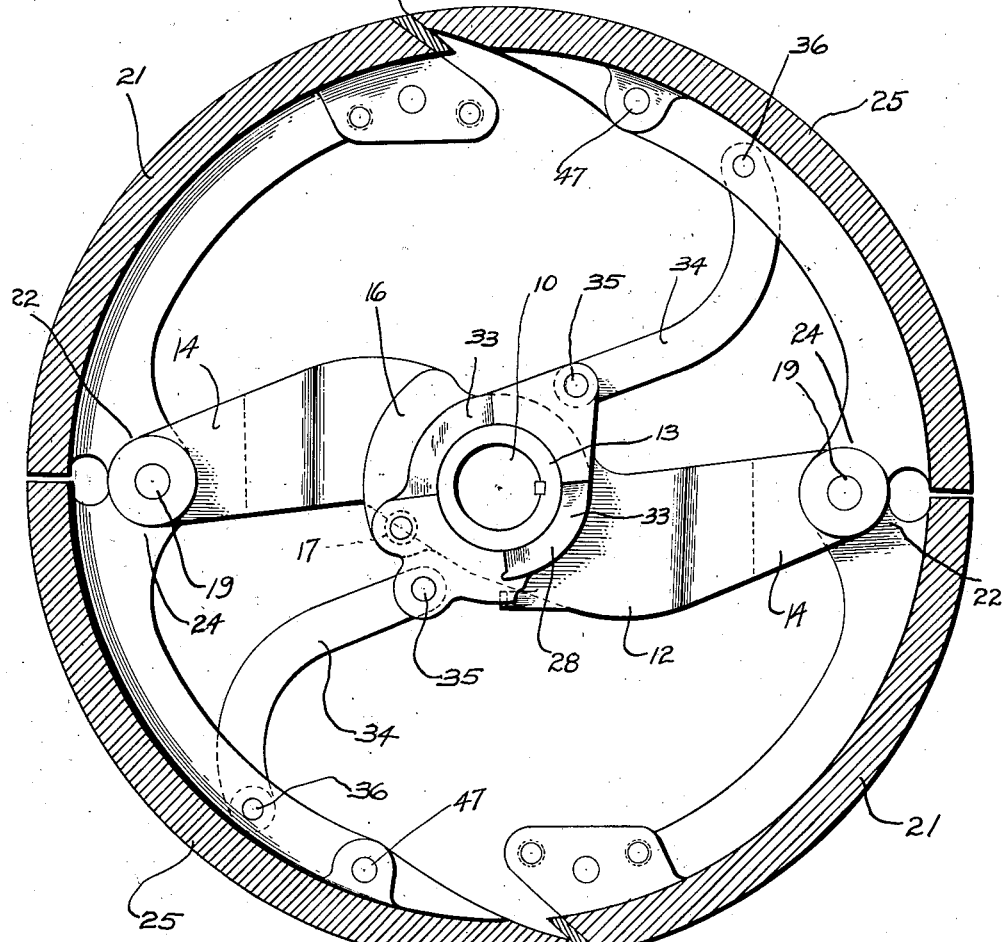
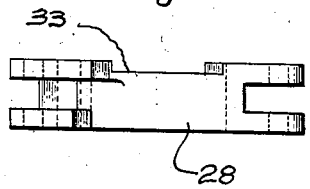
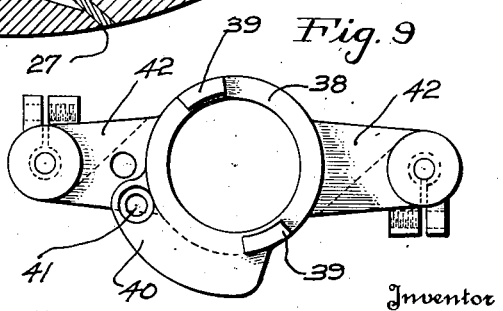
Inventor
Edwin G. Templeton
By
Attorney

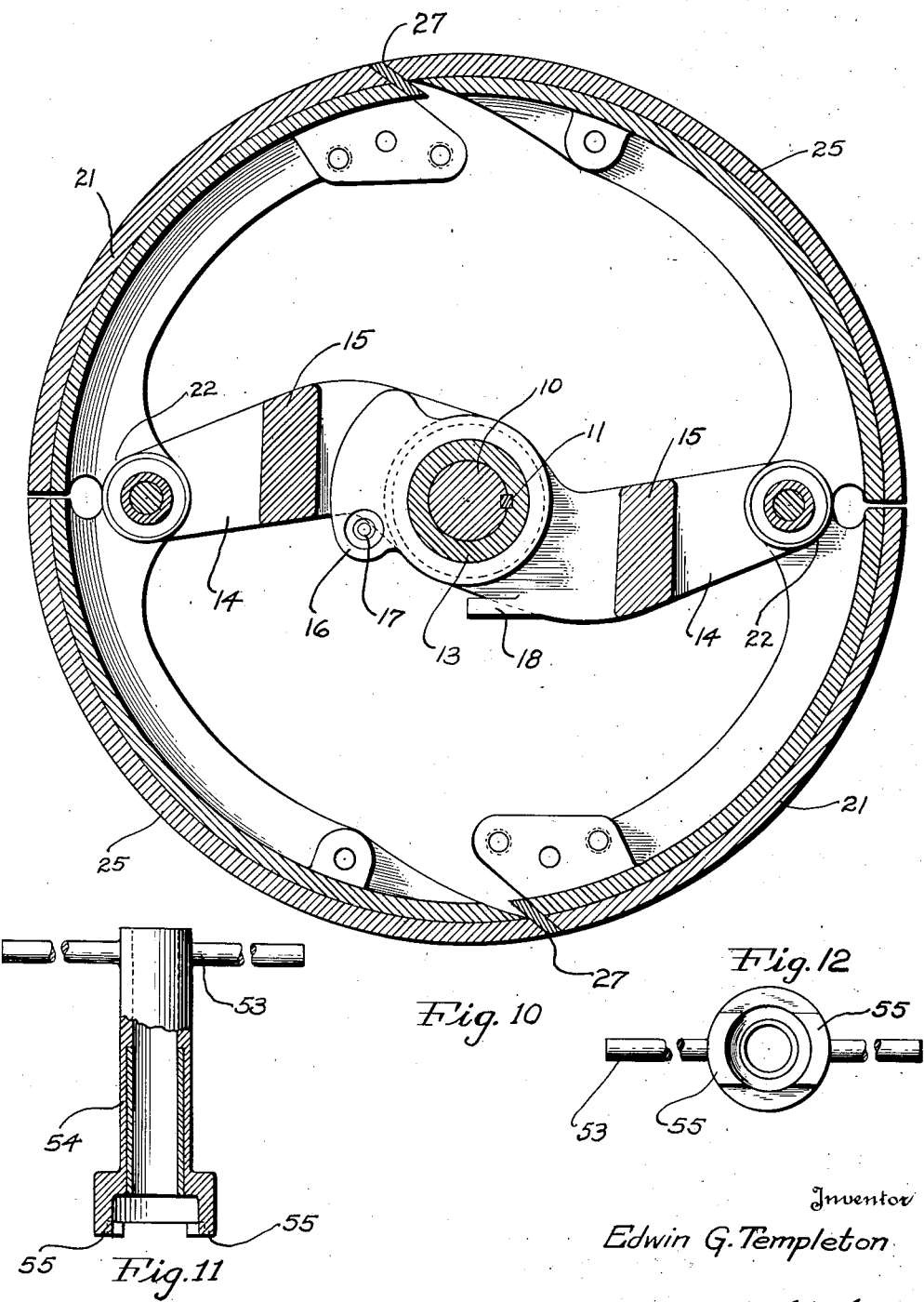

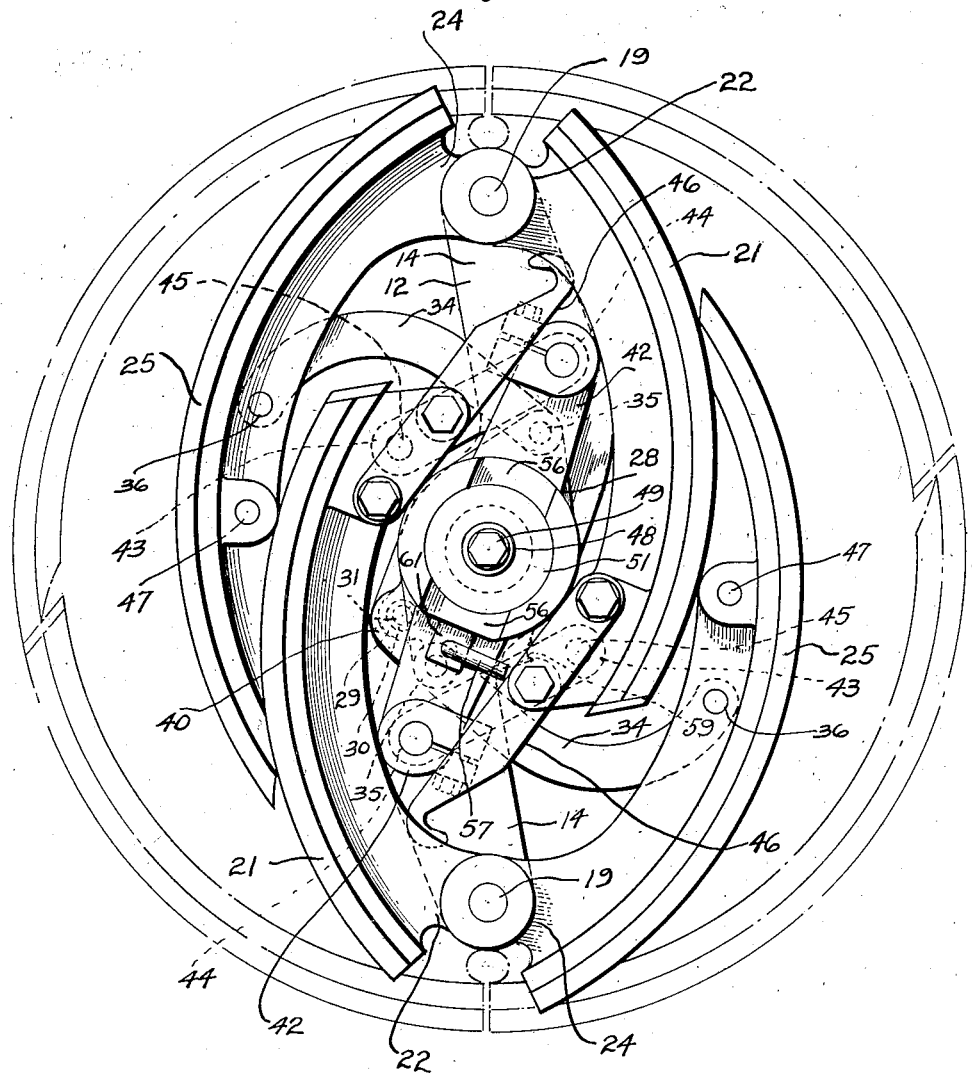

March 9, 1937.  E. G. TEMPLETON  2,073,291
COLLAPSIBLE TIRE BUILDING DRUM
Filed Feb. 11, 1935  14 Sheets-Sheet 7

Inventor
Edwin G Templeton
By
Attorney

March 9, 1937.  E. G. TEMPLETON  2,073,291
COLLAPSIBLE TIRE BUILDING DRUM
Filed Feb. 11, 1935  14 Sheets-Sheet 8

Inventor
Edwin G. Templeton

Attorney

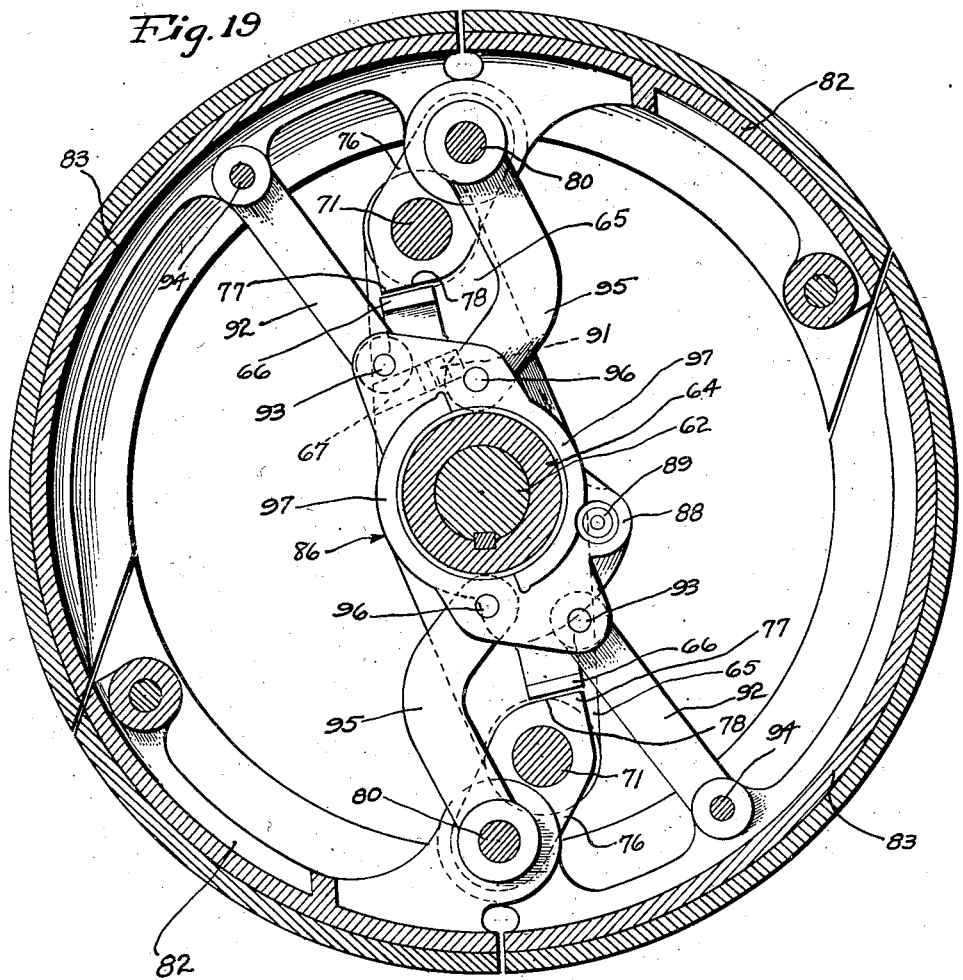

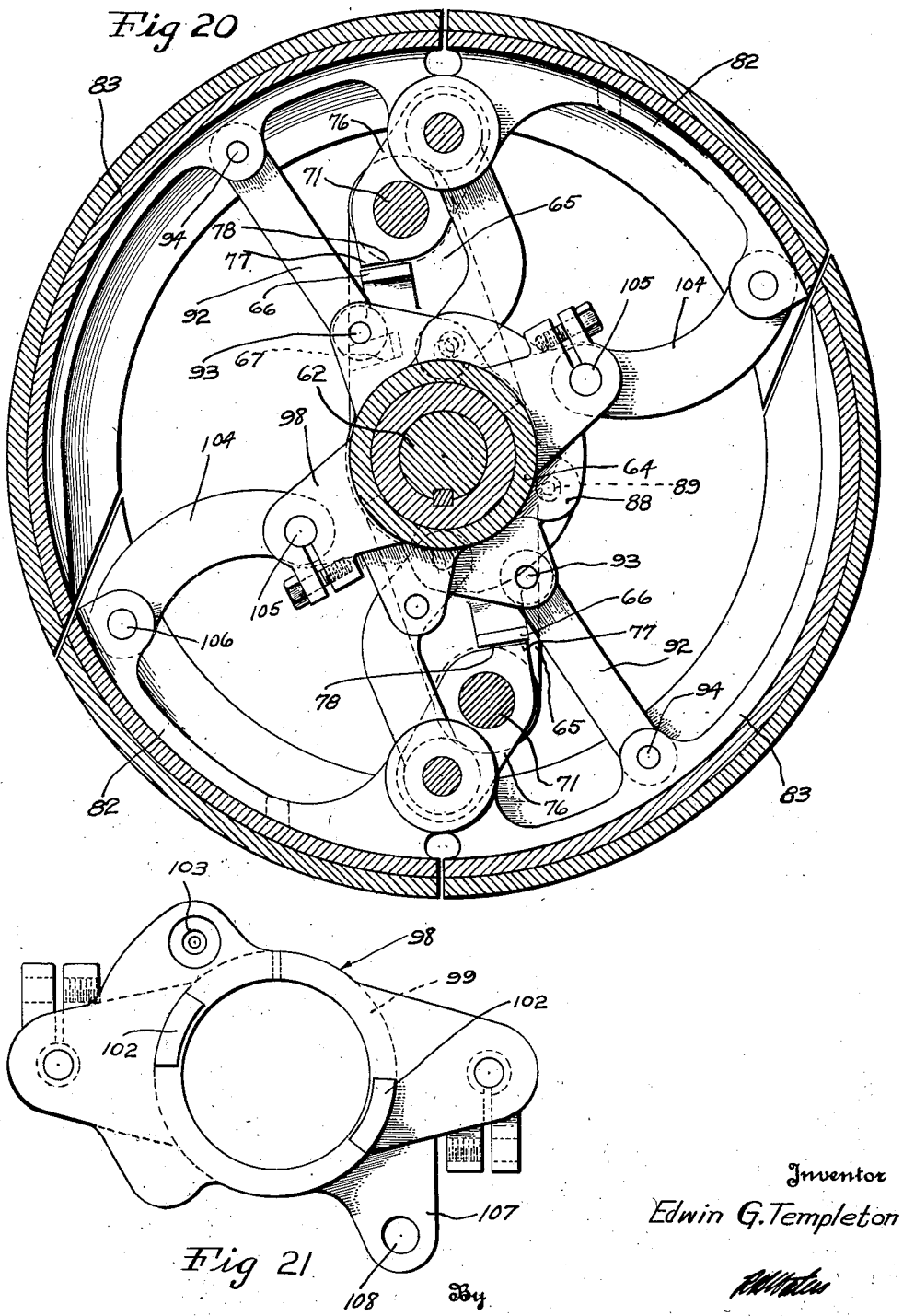

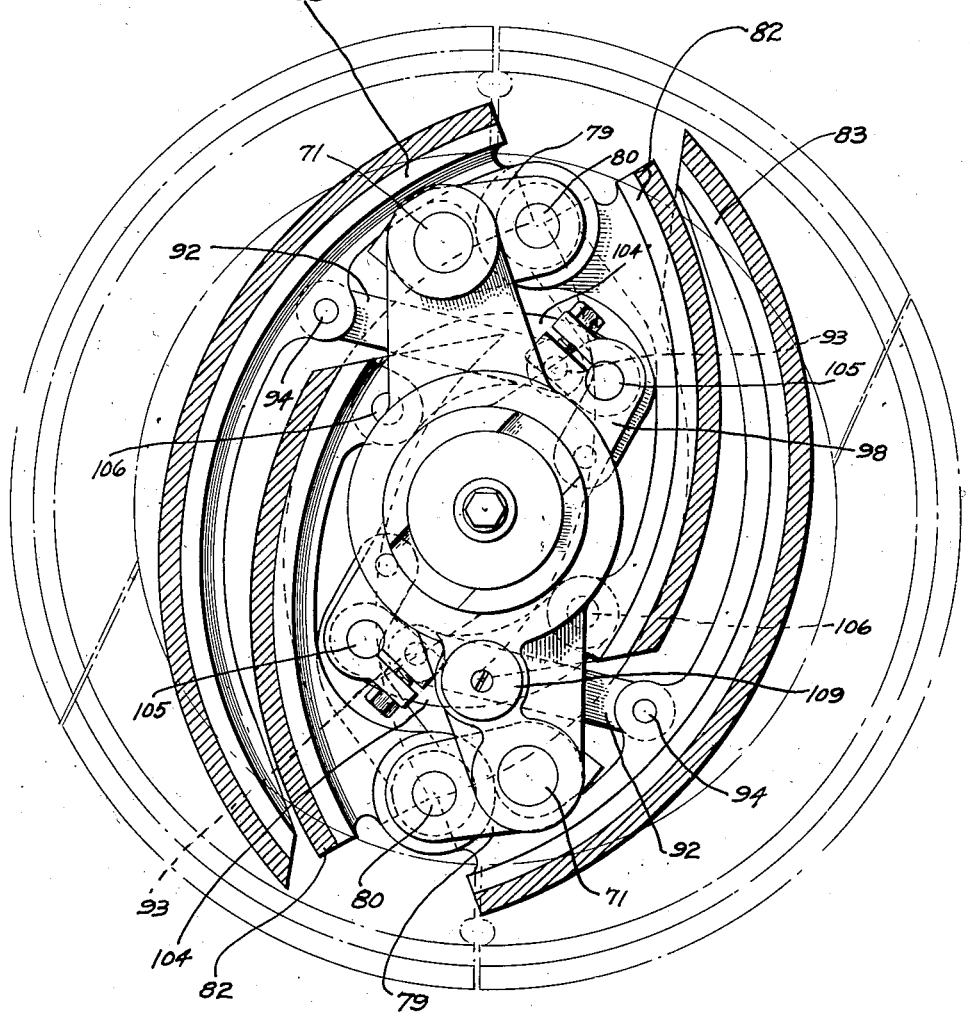

March 9, 1937.  E. G. TEMPLETON  2,073,291
COLLAPSIBLE TIRE BUILDING DRUM
Filed Feb. 11, 1935   14 Sheets-Sheet 12

Inventor
Edwin G. Templeton

By

Attorney

March 9, 1937.  E. G. TEMPLETON  2,073,291
COLLAPSIBLE TIRE BUILDING DRUM
Filed Feb. 11, 1935  14 Sheets-Sheet 14

Inventor
Edwin G. Templeton

Patented Mar. 9, 1937

2,073,291

UNITED STATES PATENT OFFICE 2,073,291

COLLAPSIBLE TIRE BUILDING DRUM

Edwin G. Templeton, Akron, Ohio, assignor to Wingfoot Corporation, Wilmington, Del., a corporation of Delaware Application February 11, 1935, Serial No. 5,913

24 Claims. (Cl. 154—9)

This invention relates to collapsible tire building drums of the type employed when constructing "flat built" or "crown built" tires which are subsequently shaped toroidally and vulcanized in the usual manner.

In building a tire of the type referred to, particularly on drums having crown portions of larger diameter than the bead-receiving portions, considerable difficulty has been experienced in satisfactorily collapsing the drum to permit removal of the tire. In some cases this difficulty was due to faulty collapsing mechanism and in others it was due to inability of the drum to collapse enough to permit ready removal of the tire. An object of this invention is to provide a collapsible tire-building drum in which maximum collapsing of all the drum segments is positively assured.

Another object is to provide novel means for effecting the positive collapse of the drum segments.

A further object is to provide novel mechanism for collapsing a drum containing four segments whereby the segments are quickly collapsed sufficiently to permit ready removal of a tire therefrom.

Other objects and advantages will become apparent from the following description in conjunction with the accompanying drawings wherein I have shown several embodiments of the invention. In this showing:

Figure 1:
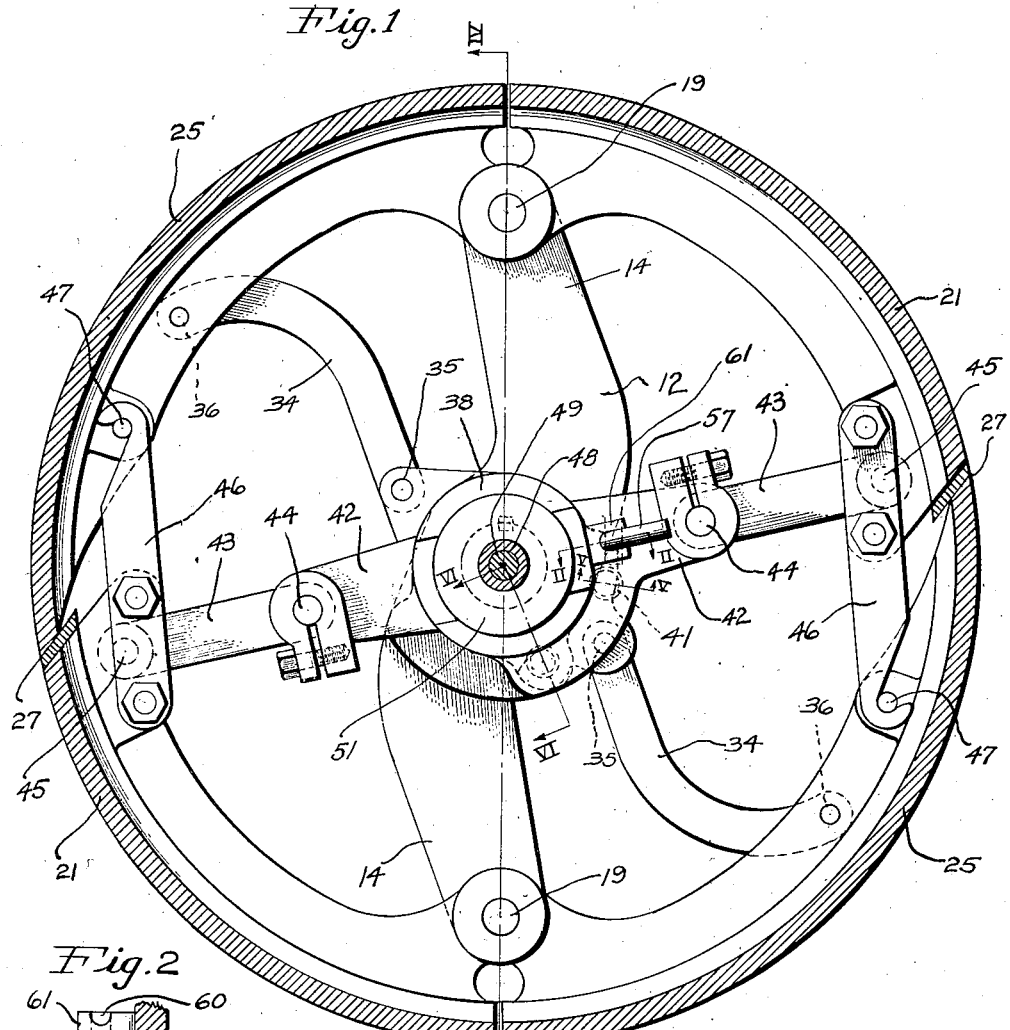
Fig. 1 is a transverse section taken substantially on line I—I of Fig. 4.
Figure 3:
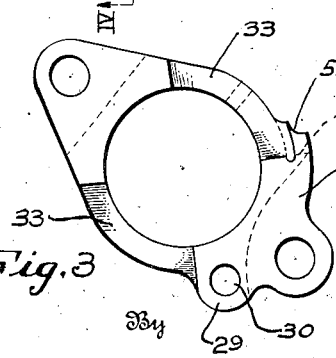
Fig. 3 is a plan view of the inner collar.
Figure 4:
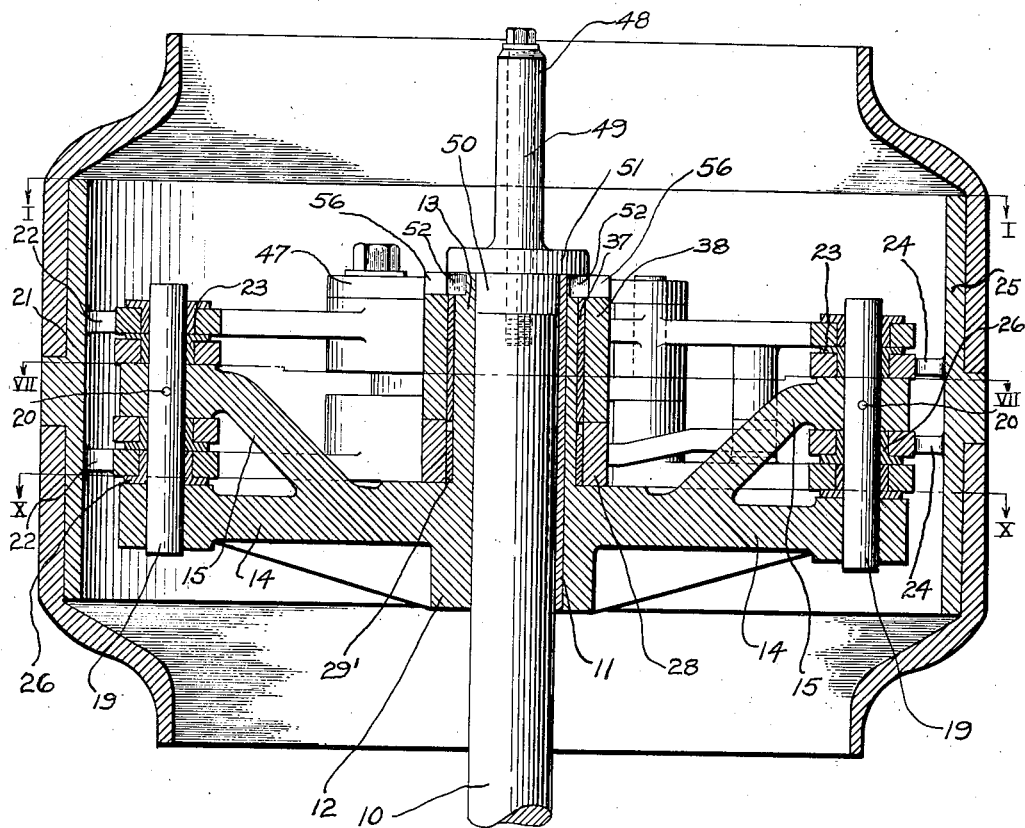
Fig. 4 is a section taken substantially on line IV—IV of Fig. 1.
Figures 5, 6:
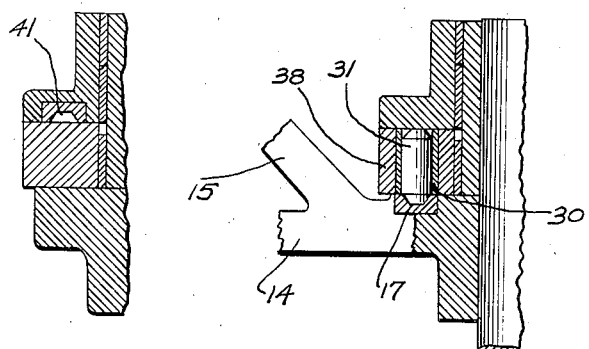

Fig. 5 is a section, partly broken away, taken substantially on line V—V of Fig. 1, Fig. 6 is a similar section taken substantially on line VI—VI of Fig. 1, Fig. 7 is a tranverse section taken substantially on line VII—VII of Fig. 4, Fig. 8 is a side elevation of the collar shown in Fig. 3, Fig. 9 is a bottom plan view of the outer collar, Fig. 10 is a transverse section taken substantially on line X—X of Fig. 4.

Figure 14:
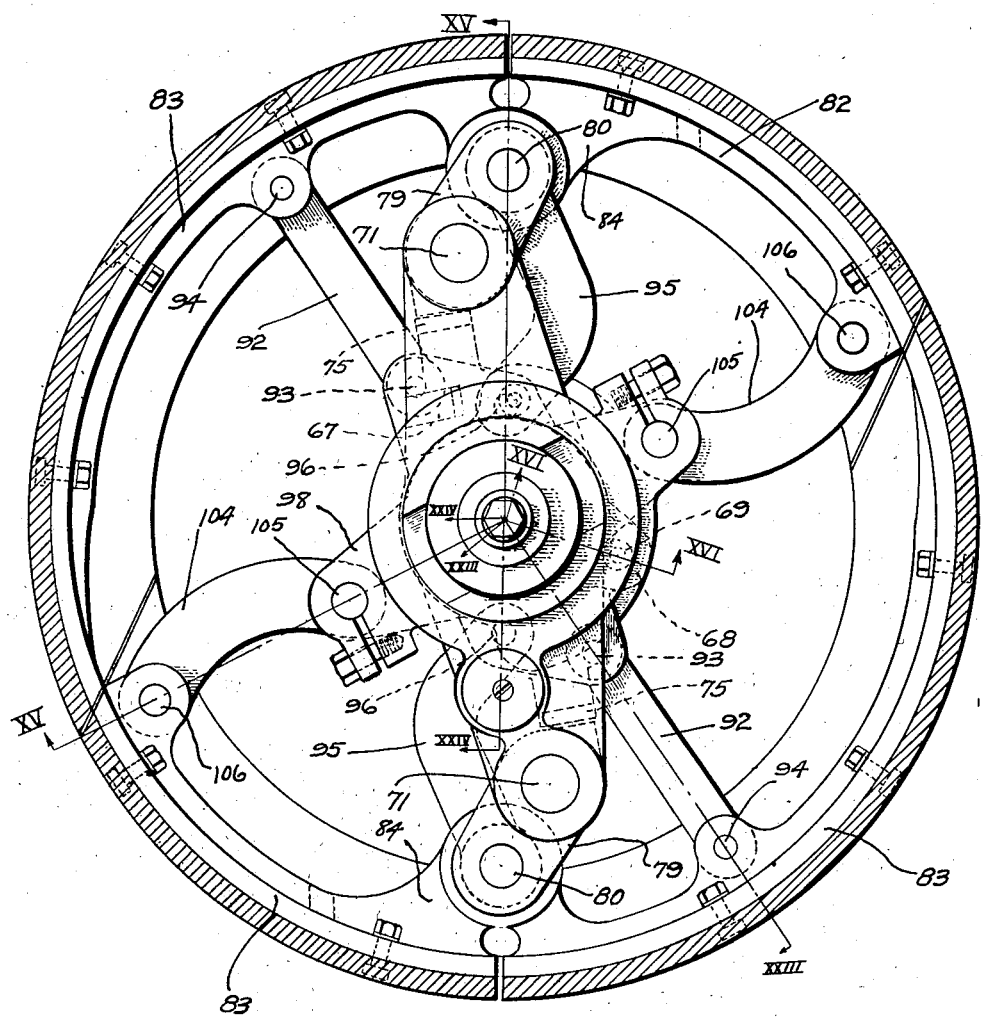
Figure 15:
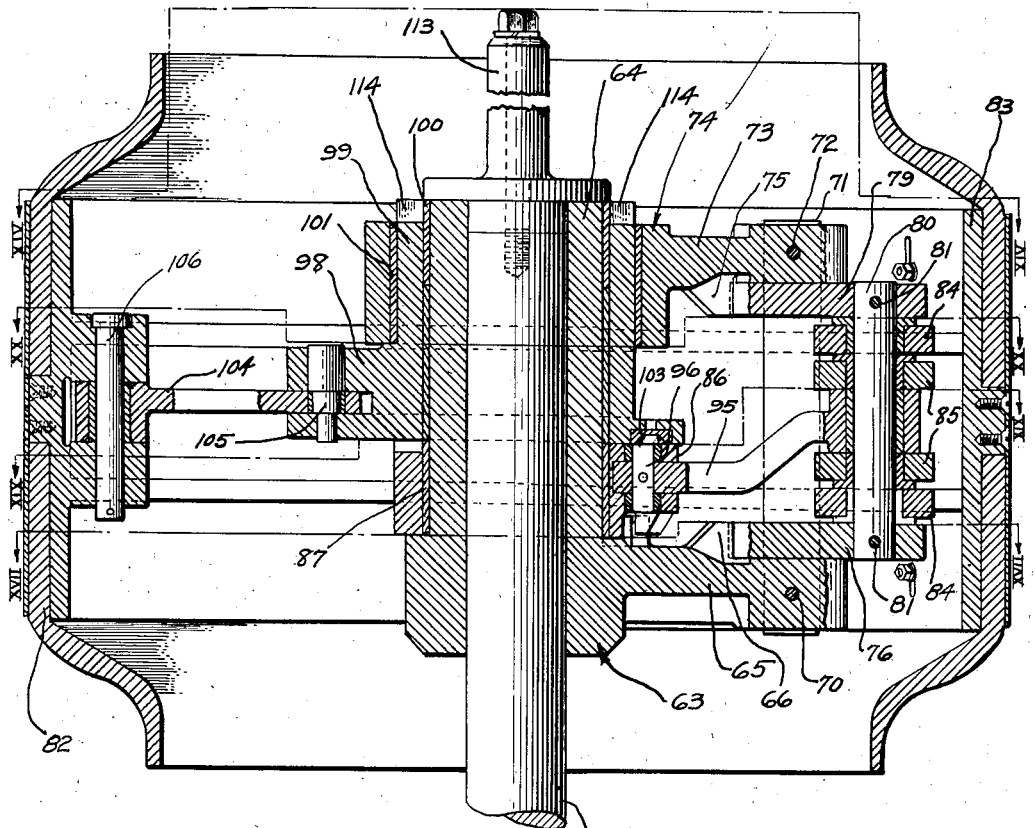
Figure 16:
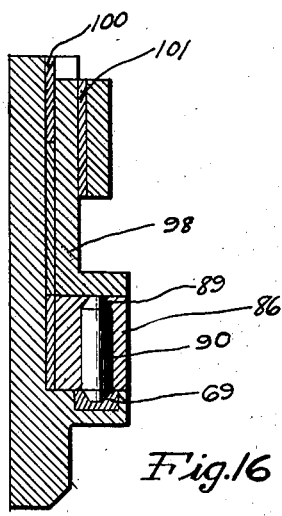
Figure 17:
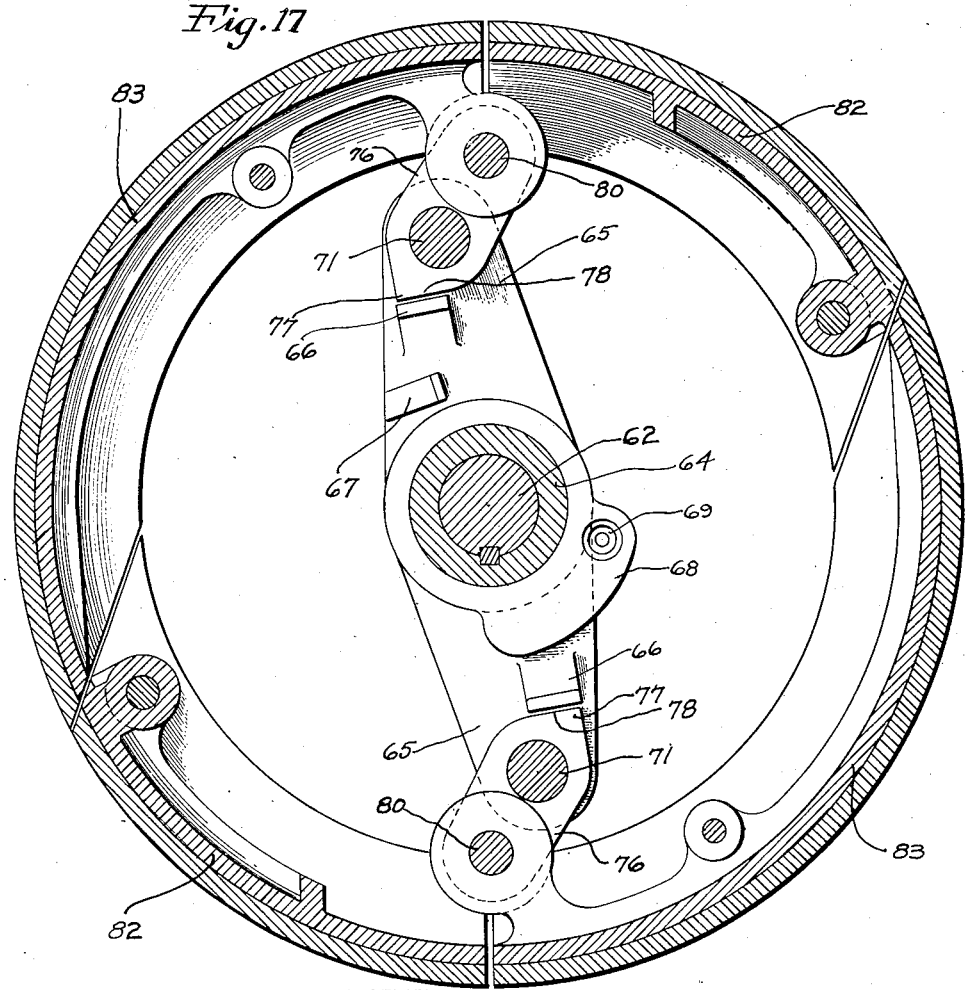

Fig. 11 is a side elevation, partly in section, of the collapsing crank,

Fig. 12 is a bottom plan view of the collapsing crank,

Fig. 13 is a side elevation of the collapsed drum illustrated in the preceding figures, Fig. 14 is a transverse section taken substantially on line XIV—XIV of Fig. 15, showing a modified form of the invention, Fig. 15 is a section taken substantially on line XV—XV of Fig. 14, Fig. 16 is a section taken substantially on line XVI—XVI of Fig. 14, Fig. 17 is a section taken substantially on line XVII—XVII of Fig. 15.

Figure 18:
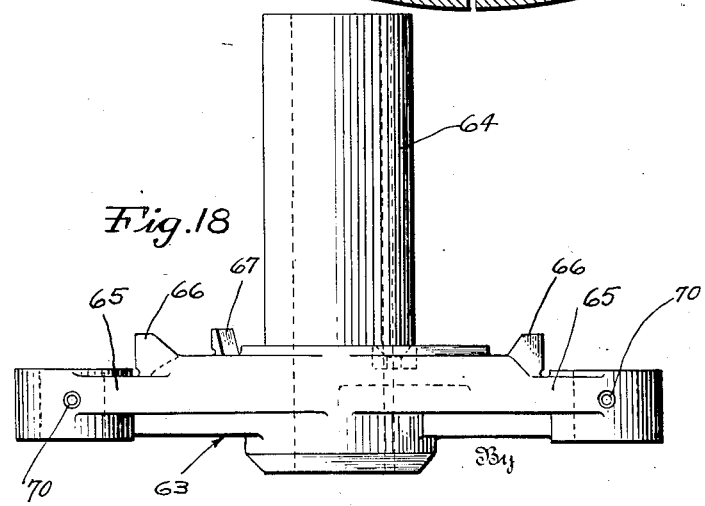
Figure 23:
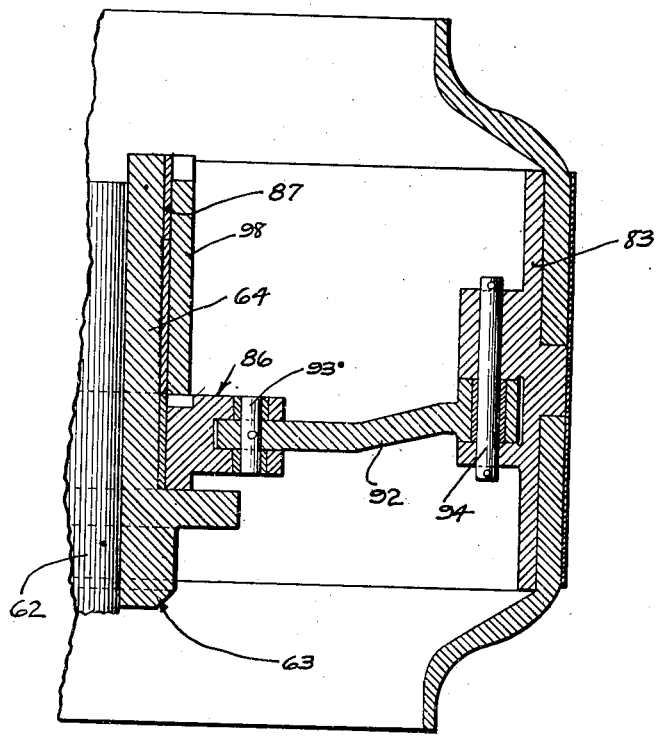
Figure 24:
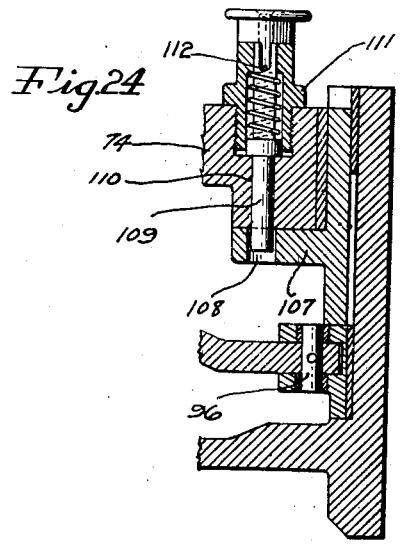
Figure 25:
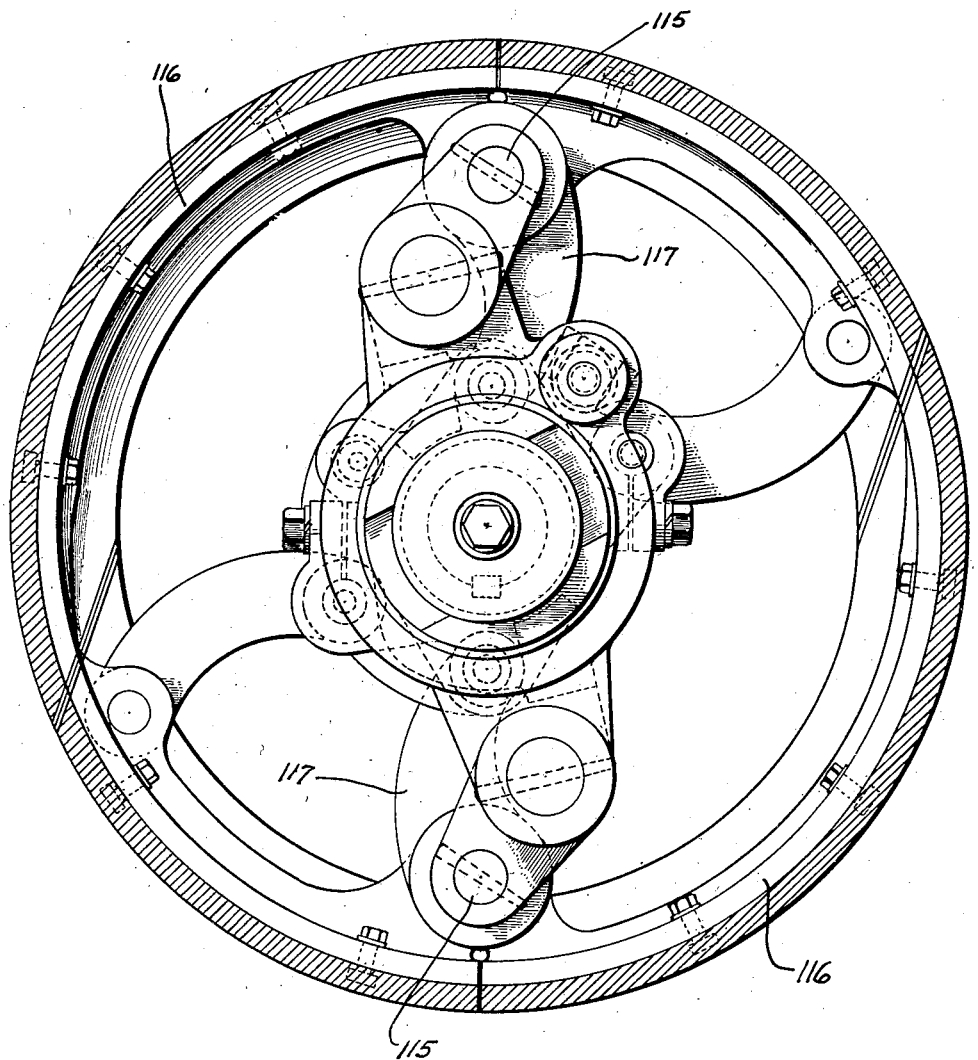
Figure 26:
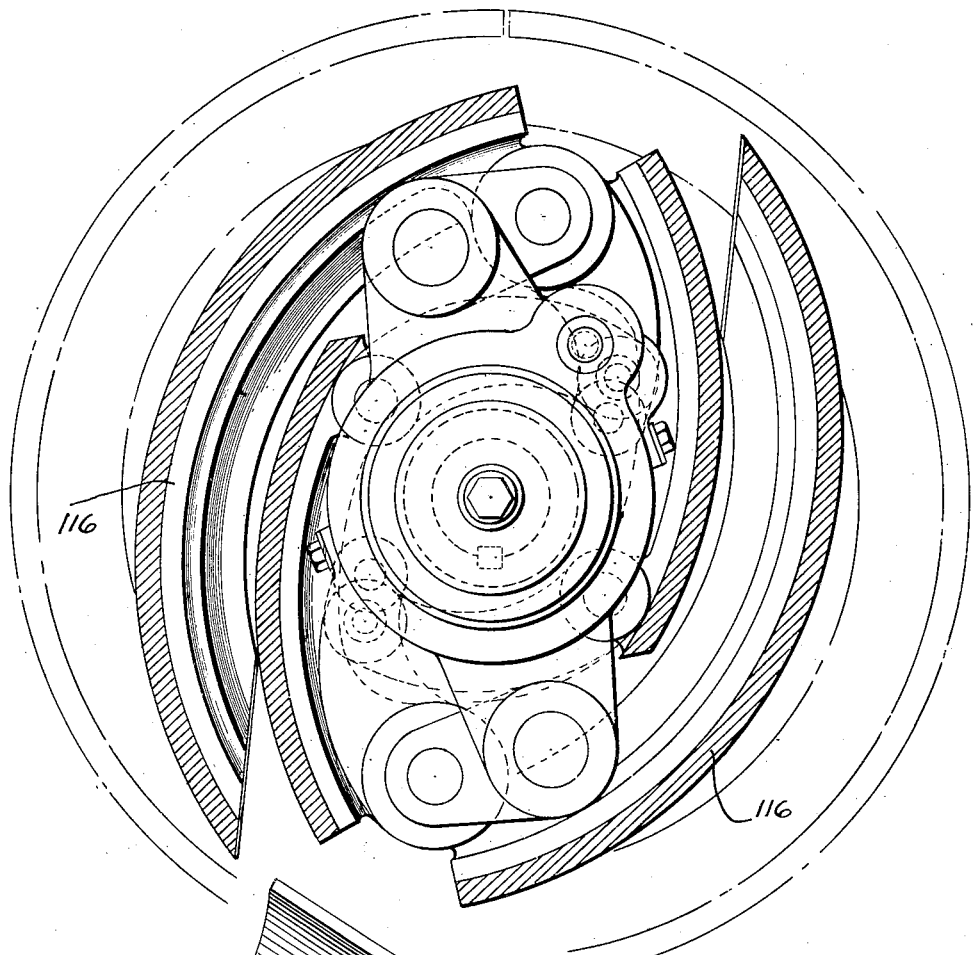

Fig. 18 is a side elevation of the inner spider,

Fig. 19 is a section taken substantially on line XIX—XIX of Fig. 15,

Fig. 20 is a section taken substantially on line XX—XX of Fig. 15,

Fig. 21 is a bottom plan of the outer collar,

Fig. 22 is a side elevation of the collapsed drum of Fig. 14,

Fig. 23 is a section taken substantially on line XXIII—XXIII of Fig. 14,

Fig. 24 is a section taken substantially on line XXIV—XXIV of Fig. 14,

Fig. 25 is a side elevation of another modified form of drum,

Fig. 26 is a side elevation of the collapsed drum shown in Fig. 25, and

Figure 27:
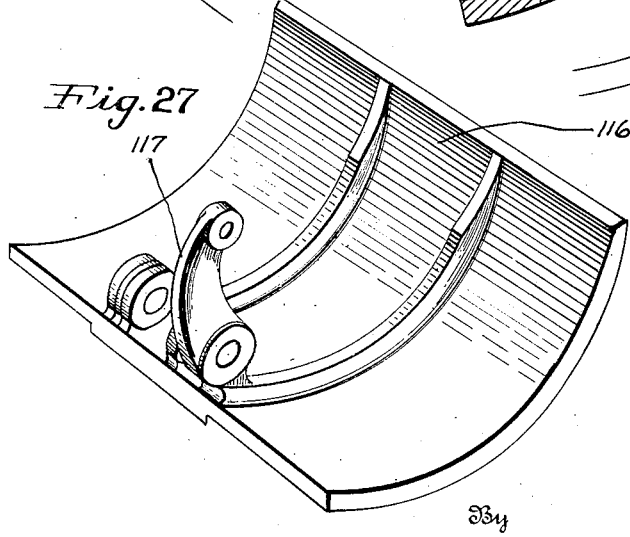

Fig. 27 is a perspective view of one of the drum sections of Fig. 25.

Referring now to the drawings numeral 10 indicates a shaft which is adapted to be rotatably mounted in the usual manner on a tire building machine. Keyed to the shaft as at 11 is a spider 12 having a reduced elongated sleeve portion 13 projecting slightly beyond the end of shaft 10. The spider is provided with bifurcated arms 14 and 15, arms 15 being inclined away from arms 14 substantially as shown in Fig. 4. As shown in Fig. 10, the spider is provided adjacent its hub with a projection 16 having a tapered depression 17 formed on the outer surface thereof for a purpose to be described. On the opposite side of the spider, also on the outer surface, a stop lug 18 is formed which projects beyond the spider for a purpose to be described.

As clearly shown in Fig. 4, hinge pins 19 are rigidly secured as at 20 in the ends of the spider arms 14 and 15. A pair of key sections 21 having hinges 22 are pivotally mounted on pins 19 and bushings 23 are interposed between the pins and hinges. Also mounted on pins 19 through the medium of hinges 24 is a pair of intermediate drum sections 25, and bushings 26 are arranged between hinges 24 and pins 19. The hinges 24 preferably are arranged inwardly of the hinges 22 to avoid interference during collapse and expansion of the drum sections and the latter are arranged in overlapping and underlapping relation with the intermediate sections 25 overlapping the key sections 21 substantially as shown at 27 in Figs. 1, 7 and 10.

Referring more particularly to Figs. 3, 4, 7, 8, a collar 28, which will be referred to as the inner collar, is rotatably mounted on sleeve 13, a suitable bushing 29 being interposed between the collar and sleeve. Collar 28 is provided with a projection 29 through which an aperture 30 is provided for alignment with the depression 17 in the spider when the collar occupies a pre-determined position. A lock pin 31 (see Fig. 6) having tapered ends extends through the aperture 30 and this pin is slightly longer than the aperture whereby when the latter is in alignment with the depression 17, as shown in Fig. 6, the outer end of the pin will be substantially flush with the surface of the collar. A projection 32 is formed on the collar and is adapted to engage the stop lug 18 on the spider to prevent rotation of the collar beyond a pre-determined point. The outer surface of the collar is provided with oppositely disposed cut out portions 33 as clearly shown in Figs. 3, 7 and 8, for a purpose to be described. On opposite sides of collar 28 curved links 34 have one end pivotally connected thereto as at 35 while the opposite ends of said links are pivotally connected to the intermediate sections 25 as at 36.

Also rotatably mounted on sleeve 13, outwardly of a bushing 37 on said sleeve is a collar 38, which will be referred to as the outer collar (see Figs. 1, 4 and 9). This collar is provided on its inner surface with arcuate projections 39 that extend into the cut out portions 33 of the inner collar 28. A lateral projection 40 is formed on collar 38 and has a tapered opening 41 therein (Fig. 5) similar to but inversely arranged with respect to the depression 17 in the spider. The arrangement of the opening 41 is such that when the collar 38 has been rotated until the opening is in alignment with the lock pin 31, at which time the projections 39 will each have moved to one end of the cut out portions 33, further rotation of collar 38 will cause similar rotation of collar 28 and the pin 31 will move out of the depression 17 into the opening 41 to permit rotation of collar 28. Obviously under these conditions the pin 31 locks the two collars together and they move in unison until the drum is fully collapsed. Arms 42 are formed on opposite sides of collar 38 and links 43 are pivotally connected to the ends of these arms as at 44 and to the key sections 21 as at 45.

Hooks 46 are rigidly connected to each key section 21 and extend into engagement with pins 47 formed on the intermediate sections 25. These hooks assist in preventing expansion of the drum sections beyond their correct positions. In collapsing, however, the hooks separate freely from the pins and do not interfere with the quick collapsing of the drum.

Means are provided to collapse and expand the drum. Referring to Fig. 4 a pilot 48 is rigidly secured to the end of shaft 10 through the medium of a bolt 49 and is provided with a skirt portion 50 fitting snugly within the spider sleeve 13. This skirt, together with a flange 51, formed on the pilot, which engages the end of sleeve 13 and has projections 52 extending into said sleeve, definitely fixes the pilot's position with respect to the drum and insures a rigid connection. As shown in Figs. 11 and 12, a crank or handle 53 is cut out inwardly whereby the shank 54 thereof will fit over the pilot 48, and arcuate prongs 55 formed on the shank will fit in cut out portions 56 formed in collar 38, whereby when the crank is rotated the collar can be rotated therewith.

Figure 2:
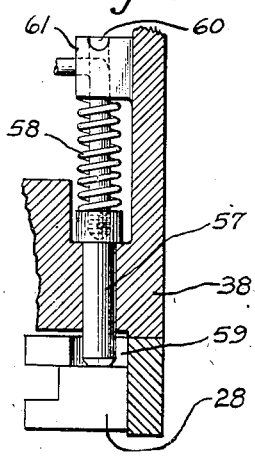
Fig. 2 is an enlarged section with parts broken away, taken substantially on line II—II of Fig. 1.

When the drum is in expanded condition it is desirable that the collars 28 and 38 be locked together to prevent any accidental movement thereof which might initiate collapse of the drum prematurely. As will be apparent, inner collar 28 is locked to spider 12 by pin 31, and projections 39 of the outer collar are at one end of cut out portions 33, thereby locking said outer collar against movement except in a direction that would collapse the sections connected to the outer collar. To prevent movement of the outer collar so as to collapse the sections co-operating with same, I have provided an elongated pin 57, spring-pressed in the customary manner by a coil spring 58. (See Fig. 2). Pin 57 extends through a suitable opening in collar 38, and when in locking position the lower end of the pin extends beyond the outer surface of the inner collar and against a semi-circular projection 59 (see Figs. 2 and 3) formed on collar 28 whereby the two collars will be completely locked against relative movement with respect to each other. The pin may be withdrawn from engagement with projection 59 by lifting same against the action of the spring and may be held out of locking position after withdrawal by turning it 90° from the position shown in Fig. 2 and permitting the right-angled upper end of the pin to rest in groove 60 formed in the top of a projection 61 on collar 38.

Collapsing of the drum shown in Figs. 1 to 13 is accomplished in the following manner: Lock pin 57 is first withdrawn as previously stated and crank 53 is placed over pilot 48 until prongs 55 are arranged in grooves 56 of collar 38. The crank is then turned to cause a clockwise turning movement of collar 38 as viewed in Fig. 1. As collar 38 turns the underlying key sections 21 will be pulled inwardly about the hinge pins 19 and these sections will continue their inward movement until collar 38 reaches its limit of movement.

While turning, the opening 41 in collar 38 will reach a position in alignment with the tapered lock pin 31 at the same time the arcuate projections 39 reach the end of the cut out portions 33 in collar 28. When this position is reached, further turning of collar 38 will also turn collar 28 through the medium of the projections 39, and pin 31 will slide out of depression 17 into opening 41, thereby unlocking collar 28 from the spider so as to permit it to turn, but at the same time locking it to collar 38 so as to prevent any relative movement between the two collars. As soon as collar 28 begins to turn, the overlapping sections 25 are also pulled inwardly and the two collars will continue their turning movement in unison, collapsing the sections until they reach the positions shown in Fig. 13.

To expand the drum, the crank is turned in the opposite direction. The two collars will turn back in unison, because they are still locked together by pin 31, until the latter becomes aligned with depression 17 in the spider, at which time pin 31 will move out of the opening 41 into the depression in the spider. The collars will thereby become unlocked whereby collar 38 can return to its initial position, and collar 28 will again be locked to the spider and against turning movement relative to the spider until collapse of the drum is again desired. To prevent collar 28 passing its proper position during its return, the projection 32 engages the stop lug 18 of the spider as soon as the pin 31 becomes aligned with depression 17, thus preventing further movement of collar 28. Also, the sections 25 will be fully expanded when projection 32 engages stop lug 18. Collar 38 is returned to its original position and expands sections 21 until they reach the position in Fig. 1 where the hooks 46 engage pins 47 and positively prevent any movement of sections 21 beyond the desired positions. Lock pin 57 is now operated to lock the collars together and the drum is ready to receive tire constituents.

The drum may or may not be capable of widthwise expansion depending upon the intent of the builder, but in Fig. 4, applicant has illustrated same as being capable of such expansion. However, this is not a feature of this invention and need not be referred to in detail.

In Figs. 14 to 24, I have shown a modified form of drum which embodies the feature of the tapered lock pin and others used in the previous form of the invention and which embodies additional features permitting a greater collapse of the drum sections than has heretofore been possible.

In this form of the invention a shaft 62 is adapted to be rotatably mounted in the customary manner on a tire building machine. A spider 63, which will be called the inner spider is suitably keyed to the shaft and has a reduced elongated sleeve portion 64 extending beyond the end of the shaft. (See Fig. 15.) This spider has arms 65, clearly shown in Figs. 17 and 18; which are provided at diametrically opposite points with stop lugs 66 for a purpose to be described. A stop lug 67, similar to the stop lug 18 is also arranged on this spider. Also, a projection 68 having therein a tapered depression 69 is provided on this spider to serve the same purpose as the similar projection and depression shown in the first form of the invention.

At the ends of the arms 65 are secured as at 70, rigid shafts 71, arranged parallel with shaft 62. These shafts 71 extend partially through the drum and are rigidly connected as at 72 to the arms 73 of a second spider 74, called the outer spider, which is provided on its inner surface with stop lugs 75 similar in size and location with lugs 66 (see Fig. 14). Pivotally mounted for limited movement around the shafts 71 are a pair of short links 76 located adjacent the outer surface of spider 63 (Figs. 15 and 17). The pivotal movement of these links is limited by virtue of a peculiar somewhat pointed formation 77 on one end thereof which provides a flat surface 78 that is adapted to engage the stop lugs 66 thereby preventing movement of the links past these lugs. Similar links 79 are arranged adjacent the inner surface of spider 74 and have one end also shaped for engagement with stop lugs 75 to limit the pivotal movement of links 79 in the same manner as links 76 (Figs. 14 and 15). The outer ends of the links 76 and 79 are secured to pins 80 as at 81, which pins serve as pivot or hinge pins for the sections of the drum.

The key sections of the drum, i. e., the sections which are adapted to move first during collapse of the drum, are indicated by the numeral 82 and the intermediate sections by the numeral 83. All of the sections are provided with suitable hinges and bushings to permit them to pivot about the pins 80 during collapse and expansion of the drum. The hinge arrangement is clearly shown in Fig. 15 with the hinges 84 of the intermediate sections 83 arranged outwardly of the hinges 85 on the key sections 82, to facilitate easy operation of the hinges.

Coming now to the means for operating the drum to collapse and expand it I refer first to Figs. 15, 19, and 23. In these figures numeral 86 designates a collar, called the inner collar, which is mounted for rotation around the spider sleeve 64, a bushing 87 being interposed between the collar and sleeve. This collar is provided with a projection 88 in which an aperture 89 is formed to receive a tapered pin 90 similar to the pin 31 (see Fig. 16), the aperture and pin being in alignment with the depression 69 in the inner spider when the collar is in the position shown in Fig. 19, which position it occupies while the drum is expanded whereby this collar and the inner spider will be locked against relative movement with respect to each other. Collar 86 is also provided on its inner surface with a projection 91 adapted to engage the stop lug 67 to limit turning movement of the collar beyond this lug. At opposite ends, this collar has pivoted thereto one end of a pair of links 92, as indicated at 93, the opposite ends of said links being pivoted to the drum sections 83, as at 94. Another pair of links 95, which are preferably curved, are also pivoted at one end to collar 86, as indicated at 96, and the opposite end of these links are pivoted to the hinge pins 80, as clearly shown in Fig. 15. On its outer surface, collar 86 is provided with arcuate grooves 97, similar to the grooves 33 in collar 28. Obviously, collar 86 is adapted to do everything collar 28 can do and in addition the former also causes the hinge pins to move inwardly during the collapse of the drum and outwardly during its expansion.

A second collar 98, called the outer collar, (see Figs. 15, 20 and 21) is also mounted for rotation about the spider sleeve 64 and has a sleeve 99 extending beyond the end of shaft 62 as shown in Fig. 15. A bushing 100 is arranged between sleeves 64 and 99, and another bushing 101 is interposed between sleeve 99 and the hub of outer spider 74. On its inner surface, collar 98 is provided with arcuate projections 102 that operate within the arcuate slots 97 of collar 86, in the same manner that projections 39 operate in slots 33. Also, a tapered opening 103 is provided in collar 98 to receive the outer end of the tapered pin 90 when opening 103 becomes aligned with the pin during rotation of the collar 98. Curved links 104 are pivotally connected at one end to opposite points on collar 98 as indicated at 105 and the opposite ends of these links are pivoted to the key sections 82 as shown at 106. A projection 107 (see Figs. 21 and 24) having an aperture 108 therein is provided on collar 98 and this aperture receives the inner end of a lock pin 109 when the drum is expanded. Pin 109 extends through a suitable aperture 110 in outer spider 74 and is spring pressed in the customary manner. The pin 109 is somewhat different from pin 57 in that it operates within a plug 111 threaded into spider 74, but it is withdrawn by hand and held out of locking position by turning it 90 degrees from the position shown in Fig. 24, so that the inner surface of flange 112 rests on the outer surface of the plug, as will be readily understood. A pilot 113, similar to pilot 48 is threaded into the end of shaft 62 and crank 54 may also be used to collapse and expand this type of drum, the sleeve 99 of collar 98 being provided with cut-out portions 114 to receive the prongs of the crank.

The collapse and expansion of this drum takes place in the same manner as in the first form of the invention, but when collar 86 is being rotated, at the proper time which is determined by the moving of lock pin 90 from the inner spider into the outer collar, links 95 pull the hinge pins 80 inwardly at the same time links 92 are pulling in the sections 83. Hence, a greater collapse of the drum sections is made possible by this movement of the hinge pins as will be apparent from a comparison of Figs. 13 and 22 wherein the collapsed positions of the two types of drum are shown. For example, the collapse of the drum in Fig. 22 has been found sufficient to permit ready removal of tires therefrom where the drum has a bead diameter of 14 inches as compared with an outside diameter of 18 inches, a degree of collapse greater than is possible with any type of drum with which I am familiar.

The drum shown in Figs. 14 to 24 inclusive is also adapted for width-wise expansion to accommodate tires having different widths but similar bead diameters. The facilities for expanding the sections width-wise have been illustrated, but as this feature is more or less standard in tire building drums since the disclosure of the Swern Patent No. 1,854,813 it is not believed to be necessary to describe this feature in detail.

Another form of the invention is shown in Figs. 25 to 27 inclusive in which the hinge pins 115 for the drum sections are also movable inwardly during the collapse of the drum, but in this form it is possible to omit links corresponding to the links 92 connected between the inner collar and the intermediate drum sections. This is accomplished by forming the intermediate sections 116 as shown in Fig. 27 and links 117 integral whereby when the inner collar is rotated during collapse of the drum, links 117, which correspond to links 95 of the second form of the invention, will simultaneously pull inwardly both hinge pins 115 and both drum sections 116. Accordingly, it will be observed that this form of the invention does away with the links 92 of the second form and provides as great a degree of collapse as the second form. Except for the omission of links 92 and the formation of links 117 integral with sections 116, the drum in Figs. 25 to 27 is substantially identical in form and operates in the same manner as the drum in Figs. 14 to 24 inclusive.

It is believed to be apparent that I have provided a tire building drum which is collapsed and expanded by novel means and which is capable of greater collapse than heretofore possible.

Although I have illustrated several embodiments of the invention, it will be apparent that the invention is not limited to these forms, but that various modifications may be made therein without departing from the spirit of the invention or from the scope of the subjoined claims.

I claim:

1. In tire building apparatus of the character described, in combination, a plurality of drum sections mounted for pivotal collapse radially of the drum, a shaft, an outer and an inner collar mounted on said shaft and relatively movable with respect thereto, means connecting one collar to certain of said drum sections to collapse such sections upon rotation of said collar relative to the shaft, means connecting the other collar to other of the drum sections to collapse such sections upon rotation of such collar relative to the shaft, means for locking the inner collar against relative rotation with respect to the shaft for a predetermined period, means for rotating the outer collar relative to the shaft and to the inner collar until the outer collar reaches a predetermined position, at which position said locking means automatically releases the inner collar for rotation relative to the shaft and locks the two collars together so that further rotation of the outer collar relative to the shaft simultaneously rotates the inner collar in unison with the outer collar.

2. In tire building apparatus of the character described, in combination, a plurality of drum sections mounted for pivotal collapse radially of the drum, a shaft, a pair of collars mounted on the shaft and relatively rotatable with respect thereto, connections between said collars and said sections operable to collapse the sections upon rotation of said collars relative to the shaft, means for rotating one of said collars independently of the other until the rotating collar reaches a predetermined position, and means locking the two collars together after said position is reached so that rotation of the collars beyond said position is in unison.

3. In tire building apparatus of the character described, in combination, a plurality of drum sections mounted for pivotal collapse radially of the drum, a shaft, an outer and an inner collar mounted on the shaft and relatively rotatable with respect thereto, connections between said collars and said sections operable to collapse the sections upon rotation of said collars relatively to the shaft, means for rotating the outer collar independently of the inner collar until the outer collar reaches a predetermined position, and means locking the two collars together after such position is reached so that rotation of the collars beyond said position is in unison.

4. In tire building apparatus of the character described, in combination, a plurality of drum sections mounted for pivotal collapse radially of the drum, a shaft, an outer and an inner collar mounted on the shaft and relatively rotatable with respect thereto, connections between said collars and said sections operable to collapse the sections upon rotation of said collars relatively to the shaft, means for rotating the collars, said means operable to rotate only the outer collar until such collar reaches a predetermined position, and means locking the two collars together after said position is reached, said means for rotating the collars being operable to rotate both collars after said position is reached.

5. In tire building apparatus of the character described, in combination, a plurality of drum sections mounted for pivotal collapse radially of the drum, a shaft, a pair of collars mounted on the shaft and relatively rotatable with respect thereto, connections between said collars and said sections operable to collapse the sections upon rotation of the collars relative to the shaft, means for rotating relative to the shaft one of said collars independently of the other until the rotating collar reaches a predetermined position, and means on the latter collar operable after said position is reached for rotating the other collar relative to the shaft.

6. In tire building apparatus of the character described, in combination, a plurality of drum sections mounted for pivotal collapse radially of the drum, a shaft, an inner and an outer collar mounted on the shaft and relatively rotatable with respect thereto, connections between said collars and said sections operable to collapse the sections upon rotation of the collars relative to the shaft, means for rotating relative to the shaft the outer collar independently of the inner collar until the outer collar reaches a predetermined position, and means on the outer collar operable after said position is reached for rotating the inner collar relative to the shaft.

7. In tire building apparatus of the character described, in combination, a plurality of drum sections mounted for pivotal collapse radially of the drum, a shaft, an inner and an outer collar mounted on the shaft and relatively rotatable with respect thereto, connections between said collars and said sections operable to collapse the sections upon rotation of the collars relative to the shaft, means for rotating relative to the shaft the outer collar independently of the inner collar until the outer collar reaches a predetermined position, means on the outer collar operable after said position is reached for rotating the inner collar relative to the shaft, and means locking the two collars together after said position is reached to insure their rotation in unison.

8. Apparatus constructed in accordance with claim 7 wherein the locking means for the two collars comprises a tapered pin movable into and out of locking position with respect to the two collars.

9. In tire building apparatus of the character described, in combination, a spider, a pair of drum sections pivotally mounted at each end of the spider, a shaft extending through the spider, a pair of collars mounted on the shaft and relatively rotatable with respect thereto, means connecting one of the collars with one section of each pair to collapse and expand such sections upon rotation of the collar relative to the shaft, means connecting the other collar to the other section of each pair to collapse and expand such sections upon rotation of the collar relative to the shaft, and means for rotating said collars relative to the shaft.

10. In tire building apparatus of the character described, in combination, a spider, a pair of drum sections pivotally mounted at each end of the spider, a shaft extending through the spider, an outer and an inner collar mounted on said shaft and relatively movable with respect thereto, means connecting the outer collar with one section of each pair to collapse such sections upon rotation of the outer collar relative to the shaft, means connecting the inner collar to the other section of each pair to collapse such sections upon rotation of the inner collar relative to the shaft, means for locking the inner collar to the spider for a predetermined period, means for rotating the outer collar relative to the shaft and the inner collar until the outer collar reaches a predetermined position, at which position said locking means automatically releases the inner collar from locking engagement with said spider and locks the two collars together so that further rotation of the outer collar relatively to the shaft simultaneously rotates the inner collar in unison with the outer collar.

11. In tire building apparatus of the character described, in combination, a spider, a pair of drum sections pivotally mounted at each end of the spider, a shaft extending through the spider, a pair of collars mounted on the shaft and relatively rotatable with respect thereto, connections between one of the collars and one section of each pair operable to collapse said sections upon rotation of said collar relative to the shaft, connections between the other collar and the other section of each pair operable to collapse such sections upon rotation of such collar relative to the shaft, means for rotating one of said collars independently of the other until the rotating collar reaches a predetermined position, and means locking the two collars together after said position is reached so that rotation of the collars beyond said position is in unison.

12. In tire building apparatus of the character described, in combination, a spider, a pair of drum sections pivotally mounted at each end of the spider, a shaft extending through the spider, an outer and an inner collar mounted on the shaft and relatively rotatable with respect thereto, connections between the outer collar and one section of each pair operable to collapse such sections upon rotation of the outer collar relative to the shaft, connections between the inner collar and the other sections of each pair operable to collapse such other sections upon rotation of the inner collar relative to the shaft, means for rotating the outer collar independently of the inner collar until the outer collar reaches a predetermined position, and means locking the two collars together after such position is reached so that rotation of the collars beyond said position is in unison.

13. In tire building apparatus of the character described, in combination, a spider, a pair of drum sections pivotally mounted at each end of the spider, a shaft extending through the spider, an outer and an inner collar mounted on the shaft and relatively rotatable with respect thereto, connections between the outer collar and one section of each pair operable to collapse such sections upon rotation of the outer collar relative to the shaft, connections between the inner collar and the other sections of each pair operable to collapse such other sections upon rotation of the inner collar relative to the shaft, means for rotating the collars, said means operable to rotate only the outer collar until such collar reaches a predetermined position, and means locking the two collars together after said position is reached, said means for rotating the collars being operable to rotate both collars after said position is reached.

14. In tire building apparatus of the character described, in combination, a spider, a pair of drum sections pivotally mounted at each end of the spider, a shaft extending through the spider, a pair of collars mounted on the shaft and relatively rotatable with respect thereto, connections between one of the collars and one section of each pair operable to collapse said sections upon rotation of said collar relative to the shaft, connections between the other collar and the other section of each pair operable to collapse such sections upon rotation of such collar relative to the shaft, means for rotating one of said collars independently of the other until the rotating collar reaches a predetermined position, and means on the latter collar operable after said position is reached for rotating the other collar.

15. In tire building apparatus of the character described, in combination, a spider, a pair of drum sections pivotally mounted at each end of the spider, a shaft extending through the spider, an outer and an inner collar mounted on the shaft and relatively rotatable with respect thereto, connections between the outer collar and one section of each pair operable to collapse such sections upon rotation of the outer collar relative to the shaft, connections between the inner collar and the other section of each pair operable to collapse such other section upon rotation of the inner collar relative to the shaft, means for rotating the outer collar independently of the inner collar until the outer collar reaches a predetermined position, and means on the outer collar operable after said position is reached for rotating the inner collar.

16. In tire building apparatus of the character described, in combination, a spider, a pair of drum sections pivotally mounted at each end of the spider, a shaft extending through the spider, an outer and an inner collar mounted on the shaft and relatively rotatable with respect thereto, connections between the outer collar and one section of each pair operable to collapse such sections upon rotation of the outer collar relative to the shaft, connections between the inner collar and the other sections of each pair operable to collapse such other sections upon rotation of the inner collar relative to the shaft, means for rotating the outer collar independently of the inner collar until the outer collar reaches a predetermined position, means on the outer collar operable after said position is reached for rotating the inner collar, and means locking the two collars together after said position is reached to insure their rotation in unison.

17. Apparatus constructed in accordance with claim 16 wherein the locking means for the two collars comprises a tapered pin movable into and out of locking position with respect to the two collars.

18. Apparatus constructed in accordance with claim 16 wherein the locking means for the two collars comprises a tapered pin movable into and out of locking position with respect to the two collars, said spider being provided with a tapered depression adapted to receive one end of the pin to lock the inner collar to the spider when such collar is not locked to the outer collar.

19. In tire building apparatus of the character described, the sub-combination of a plurality of collapsible drum sections and means for collapsing said sections comprising a pair of rotatable collars and connections between the collars and drum sections for collapsing the sections upon rotation of the collars, one of the collars being rotatable independently of the other for a predetermined period in its rotation to initiate collapse of certain of the sections; and means on said last mentioned collar for engaging the other collar at the end of said period to rotate the other collar to collapse certain other of the sections.

20. In tire building apparatus of the character described, in combination, a plurality of drum sections mounted for pivotal collapse and expansion radially of the drum, a shaft, a pair of collars mounted on the shaft and relatively rotatable with respect thereto, means connecting one of the collars with certain of the drum sections to collapse and expand such sections upon rotation of the collar relative to the shaft, means connecting the other collar to other of the drum sections to collapse and expand such sections upon rotation of the collar relative to the shaft, means for rotating said collars relative to the shaft to collapse and expand the drum sections, and means for moving the pivot points of said drum sections during their collapse and expansion.

21. In tire building apparatus of the character described, in combination a plurality of drum sections mounted for pivotal collapse radially of the drum, a shaft, a pair of collars mounted on the shaft and relatively rotatable with respect thereto, connections between one of said collars and certain of the sections for collapsing such sections upon rotation of such collar relative to the shaft, connections between the other of said collars and certain other sections for collapsing such other sections upon rotation of such other collar relative to the shaft, and means connecting one of said collars with the pivot points of said sections to swing such pivot points inwardly during rotation relative to the shaft of the collar having said means connected thereto.

22. In tire building apparatus of the character described, in combination, a plurality of drum sections mounted for pivotal collapse radially of the drum, a shaft, a pair of collars mounted on the shaft and relatively rotatable with respect thereto, connections between said collars and said sections operable to collapse the sections upon rotation of the collars relative to the shaft, means for rotating relative to the shaft one of said collars independently of the other until the rotating collar reaches a predetermined position, means on the latter collar operable after said position is reached for rotating the other collar relative to the shaft, and means connecting said last mentioned collar to the pivot points of said drum sections to move said pivot points inwardly during rotation of said last named collar relative to the shaft.

23. In tire building apparatus of the character described, in combination, a plurality of drum sections mounted for pivotal collapse radially of the drum, a shaft, an inner and an outer collar mounted on the shaft and relatively rotatable with respect thereto, connections between said collars and said sections operable to collapse the sections upon rotation of the collars relative to the shaft, means for rotating relative to the shaft the outer collar independently of the inner collar until the outer collar reaches a predetermined position, means on the outer collar operable after said position is reached for rotating the inner collar relative to the shaft, and means connecting the inner collar to the pivot points of said drum sections to move said pivot points inwardly during rotation of the inner collar relative to the shaft.

24. In tire building apparatus of the character described, in combination, a spider, a pair of links, each link pivoted at one end on opposite sides of said spider, a pair of drum sections pivoted on the other end of each of said links, a shaft extending through the spider, a pair of collars mounted on the shaft and relatively rotatable with respect thereto, means connecting said collars to the drum sections for collapsing said sections upon rotation of the collar relative to the shaft, said means including connections between at least one of said collars and the pivot points of said sections to move said pivot points inwardly during collapse of said sections, and means for rotating said collars relative to the shaft.

EDWIN G. TEMPLETON.